US006557436B1

(12) United States Patent
Hetrick et al.

(10) Patent No.: US 6,557,436 B1
(45) Date of Patent: May 6, 2003

(54) DISPLACEMENT AMPLIFICATION STRUCTURE AND DEVICE

(75) Inventors: Joel Hetrick, Ann Arbor, MI (US); Sridhar Kota, Brighton, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/658,058

(22) Filed: Sep. 8, 2000

Related U.S. Application Data

(60) Provisional application No. 60/153,340, filed on Sep. 10, 1999.

(51) Int. Cl.[7] .............................................. F16H 21/44
(52) U.S. Cl. ........................... 74/517; 74/108; 267/165; 310/331
(58) Field of Search .......................... 74/108, 110, 516, 74/517; 267/165; 310/330, 331

(56) References Cited

U.S. PATENT DOCUMENTS

| 304,695 | A | * | 9/1884 | Brinckerhoff | ........... 236/101 R |
| 4,367,658 | A | * | 1/1983 | Rochelt | .................... 74/40 |
| 4,686,440 | A | * | 8/1987 | Hatamura et al. | ..... 250/442.11 |
| 5,631,514 | A | | 5/1997 | Garcia et al. | |
| 5,649,454 | A | * | 7/1997 | Midha et al. | ................ 267/160 |
| 5,802,914 | A | * | 9/1998 | Fassler et al. | ................ 74/110 |

FOREIGN PATENT DOCUMENTS

DE          19843737 A1 *  3/2000

* cited by examiner

*Primary Examiner*—David Fenstermacher
(74) *Attorney, Agent, or Firm*—Harness, Dickey & Pierce, P.L.C.

(57) ABSTRACT

A displacement modifying structure for receiving an input displacement from a motor source and generating a multiplied displacement therefrom for provision to a load. The structure includes a static beam and a dynamic beam. The static beam has a fixed end and a movable end while the dynamic beam has a first end and a second end. The first end of the dynamic beam is connected between the motive source and the movable end of the static beam. The second is also connected through a pivotless joint to the movable end of the static beam. Upon movement of the first end over a first distance by the motive source, the second end of the dynamic beam and the movable end of the static beam move over a second distance for provision to the load. The second distance, or output displacement is greater than the first distance.

33 Claims, 9 Drawing Sheets

$E = 2\,MPa$
$we = 0.25\,cm$
$\eta_{efficiency} = 96.7\%$
$MA_{initial} = 1:2.5$
$MA_{final} = 1:2.53$
$GA_{loaded} = 2.43:1$
$GA_{loaded} = 2.5:1$
$volume = 1\,cm^3$
$max\,\sigma = 20\,MPa$ $E = 2\,MPa$
$we = 0.5\,cm$
$\eta_{efficiency} = 95.9\%$
$MA_{initial} = 1:3.16$
$MA_{final} = 1:3.20$
$GA_{loaded} = 3:1$
$GA_{loaded} = 3.16:1$
$volume = 2.5\,cm^3$
$max\,\sigma = 11\,MPa$

DISPLACEMENT AMPLIFICATION STRUCTURE AND DEVICE

This application claims the benefit of provisional application No. 60/153,340 filed Sep. 10, 1999.

GOVERMENT RIGHTS

This invention was made with government support under Grant No. DMI-9622261, awarded by the National Science Foundation, and under Contract No. F49620-96-1-0205, awarded by the Airforce Office of Scientific Research. The U.S. government has certain rights in this invention.

FIELD OF THE INVENTION

The present invention generally relates to the field of mechanisms which modify the displacement or force generated by an actuator. More specifically, the present invention relates to a core structure, and devices having a plurality of these core structures, that relies on the elastic deformation of its constituent elements to transmit forces and motion from an input to an output. In one specific embodiment, the preset invention relates to the field of microelectromechanical (MEM) systems and, in particular, to a pivotless structure formed by surface micromachining processes for use in combination with a MEM actuator (such as an electrostatic comb actuator, a capacitive-plate electrostatic actuator) or a thermal actuator to modify a displacement or force provided by the MEM actuator.

BACKGROUND OF THE INVENTION

Historically, engineered devices are designed to be strong and stiff and engineered systems are usually assembled from discrete components. In nature, however, designs are strong and compliant and natural systems develop as one connected whole.

The limitation of many currently available actuators, and in particular smart material actuators, is their small stroke and power. Currently, piezoelectric actuators have a high bandwidth, but low strain, whereas shape memory alloy (SMA) actuators have relatively high strain, but extremely low bandwidth. The use of the above-type actuators in a system design must therefor involve a stain versus weight versus bandwidth tradeoff. In an effort to amplify their displacement, some investigators have pursued the stacking of multiple actuators in different configurations. Although modest displacement amplification can be achieved in this manner, these arrangements are often cumbersome and impose a heavy penalty by way of voltage requirements.

In the formation of many types of microelectromechanical (MEM) devices, a motive forcer or actuator is required. The previous used electrostatic comb actuators have generally consumed a large portion of the die on which the MEM device is formed (e.g. up to ⅔ of the die size). Further, the die size is constrained by available steppers used for the photolighographic processes of the MEM fabrication process. As a result, the size and complexity of MEM devices is presently constrained by the size of the actuator used.

Reducing the size of the motive source can alleviate this problem and leave more space on the die for MEM devices of increased complexity and functionality. A smaller-sized electrostatic comb actuator, however, will produce a correspondingly smaller range of displacement (i.e. a smaller actuation stroke) which can be, for example, about 5 microns or less. Thermal actuators and capacitive-plate electrostatic actuators generally provide a much larger force than is available with electrostatic comb actuators. However, this larger force is generated over a short actuation stroke of typically 0.25–2 $\mu$m. Such a short actuation stroke is insufficient for driving many types of MEM devices including ratchet-driven gears, stages or racks; or microengines such as that disclosed in U.S. Pat. No. 5,631,514 to Garcia et al.

From the above it is seen that there is a need in a MEM device for a mechanism that multiplies the range of displacement from a short-stroke actuator and provides an increased range of displacement that is sufficient for actuating a particular MEM device. This will allow the use of compact electrostatic comb actuators or, alternately, capacitive-plate or thermal actuators, allowing the formation of MEM devices of increased complexity and functionality within a give die size.

Employing mechanical means to modify (amplify or attenuate or reorient) an output displacement or force is not new. Perhaps the simplest displacement-amplifying device is a lever arm moving about a pivot joint. A lever arm is shown in FIG. 1. The use of a pivoted displacement-modifying device, however, may be undesirable in certain situations. For example, if a linear output is desired, devices utilizing a pivoting lever arm provide movement $d_2$ at the output end of the lever arm which is arcuate. Play in the pivot joint, which is limited by fabrication tolerances, can render a lever arm undesirable, as can a required high geometric advantage, which would require extreme length in $L_2$. The play in the pivot joint of a MEM device can be substantial compared to the range of displacement of a short-stroke actuator. For example, a thermal actuator can provide a range of displacement that is only 0.25 $\mu$m, when heated from room temperature to about 400° C. This is comparable to the actual amount of play in MEM pivot joints and as such the use of a displacement-multiplying device having a pivot joint would not be suitable for use in increasing the range of displacement of a thermal actuator. Additionally, an arcuate output displacement can complicate the design of the MEM device.

Another variety of a displacement modifying strategy is a rigid link system. FIG. 2 illustrates a crimping mechanism employing a conventional rigid link displacement modifying strategy. When operated in one direction the mechanism amplifies displacement and when operated in the opposing direction it amplifies force.

Compliant mechanisms are a relatively new class of devices that utilize elasticity or compliance elements to transmit motion and/or force. They can be designed for any desired input-output force displacement characteristics, including specified volume/weight, stiffness and natural frequency constraints. A "compliant mechanism" is defined herein as a structure that exploits elastic deformation to achieve a force/displacement transformation, with the displacement being changed (e.g. increased) relative to an input force provided to the same end of the compliant structure. In one direction of operation, an output displacement is increased relative to an input displacement; and an output force is correspondingly decreased relative to an input force. In the other direction of operation, the opposite effect occurs with the output force being increased relative to the input force; and with the output displacement being decreased relative to the input displacement. As flexure is permitted in these mechanisms, they can be readily integrated with unconventional actuation schemes including the above mentioned actuators. Compliant mechanisms can be made from any ductile material such as nylon, aluminum, steel, nickel-titanium alloy, etc.

More specifically, compliant mechanisms are single-piece flexible structures that deliver the desired motion by undergoing elastic deformation as opposed to rigid body motions of conventional mechanisms. As compliant mechanisms are thus far known in the art, they have been limited to the replacement of mechanical hinges with flexural joints (living hinges). One such mechanism having a living hinge flexural joint is illustrated in FIG. 3. However, simply replacing mechanical joints with flexural joints has the disadvantages of being a source of stress concentration leading to early fatigue failure (as a result of the flexural joints being unusually thin and resultant stress concentrations), being a source of significant efficiency loss due to the large localized strain energy loss at each of the flexural joints and can be difficult to manufacture.

Compliant mechanisms having flexural joints are seen to exhibit what is herein referred to as "lumped compliance". Lumped compliance results because the thin flexural joints localize strain energy losses where flexing in the device occurs, at each of the flexural joints. Between the flexural joints, these structures generally operate in a rigid manner. FIG. 3b illustrates in cross-section a lumped compliant device as might be used in a precision instrument.

The present invention proposes a deviation from the known art of compliant mechanisms. More specifically, the present invention proposes a compliant mechanism which lacks the flexural joints of the prior art. A compliant mechanism according to the present invention is pivotless or jointless and exhibits what is herein referred to as "distributed compliance". In other words, compliance spread across the mechanism's elements themselves, whereby energy is transferred efficiently from the input actuator to the output.

It is therefore an object of the present invention to provide a pivotless compliant mechanism to modify the displacement of force generated by an actuator.

A further object of this invention is to provide a single-piece pivotless compliant mechanism that relies on an elastic deformation distributed across its constituent elements to transmit forces and displacement from the input to the output.

A related object of this invention is to provide a pivotless compliant mechanism where the joining of two of its constituent members exhibits a more or less uniform cross-section and not a thin flexural joint.

An advantage of this invention is that the mechanism is very energy efficient, easy to manufacture, long lasting and highly reliable.

Still another object of this invention is to provide a pivotless compliant mechanism that can be used in combination with a MEM actuator to form a MEM apparatus having a different output displacement and force from that provided by the actuator.

An advantage of the present invention is that play due to fabrication tolerances is substantially reduced compared with pivoting mechanisms.

Yet another advantage of the present invention is that a linear displacement from a MEM actuator can be provided as an input to the pivotless compliant mechanism to generate a different displacement range that is also linear (i.e. along a straight line).

A further advantage of the present invention is that the pivotless compliant mechanism can be designed to respond to an input force and displacement and generate therefrom an output force and displacement that is directed either substantially in-line with the input force and displacement or at an arbitrary angle with respect to input force and displacement.

Another advantage of the present invention is that the pivotless compliant mechanism can be designed to operate with a MEM actuator providing a range of displacement of less than or equal to 5 microns and generate therefrom an output displacement that is multiplied by a factor in the range of 5 to 60 (with a correspondingly reduced output force). This can allow, for example, the use of compact short-stroke electrostatic or thermal actuators to generate a range of displacement suitable for use in driving MEM ratcheting devices or microengines.

Yet another advantage of the present invention is that the pivotless compliant structure can be used in a reverse sense to multiply the force provided by a MEM actuator with a corresponding reduction in the range of displacement available from the compliant structure. This can allow, for example, the use of long-stroke electrostatic comb actuators to provide an increased force over that which could otherwise be generated.

These and other advantages of the present invention will become evident to those skilled in the art.

SUMMARY OF THE INVENTION

In achieving the above and other objects, the present invention is a pivotless compliant mechanism, also referred to herein as a displacement modifying structure, which can be utilized individually or with similar structures to form a compliant transmission device (CTD). The main building block of such a CTD pursuant to this invention is the base displacement modifying structure itself, which may be viewed as a triangular form or element with two of its legs formed by beams, the beams being connected to one another at one end, and having a third (imaginary) leg defined across the distance between the two opposing ends of the beams. The displacement modifying structure of the present invention comprises a static beam and dynamic beam. The static beam has a fixed end and a moveable end while the dynamic beam has a first end and a second end, with the second end being connected through a pivotless joint to the moveable end of the static beam. Upon movement by an actuator of the first end of the dynamic beam over a first distance, the connected second end of the dynamic beam and the moveable end of the static beam move over a second distance. This second distance is modified relative to the first distance.

While the term 'modified' has been thus far used in describing the present invention, it should be understood that 'amplifying', 'attenuating' and 'reorienting' are intended to be interchangeable therewith unless otherwise noted. Hereafter, the word 'amplifying' will be used in describing the invention since it is believed that the invention's biggest field of use will be in amplifying displacement.

When properly designed, a singular triangular element of the present invention amplifies the motion from the input force and orients it in a direction generally perpendicular to the triangle's apex (where the beams are joined together). In constructing a CTD, such triangular elements can be cascaded together in many different ways to achieve a desired displacement amplification. Such cascading or joining of a series of the displacement amplifying structures will be more clearly understood from the detailed discussion that follows. In some preferred embodiments, the amplified displacement or output is provided as linear motion and in others it is provided as rotary motion. In another embodiment, a series of displacement amplifying structures are arranged in mirror symmetry about a common axis to provide motion substantially along the axis.

The present invention, as applied in a MEM system, is formed on a substrate for receiving an input at one end (from an actuator) and generating a multiplied displacement which is provided to a load. The structure of the MEM system comprise a flexible beam, the static beams, fixedly attached at one end to the substrate, with the other end of the static beam being moveable. A dynamic beam is connected between the actuator and the moveable end of the static beam. A series of additional static and dynamic beams, with each dynamic beam connected between the moveable ends of successive static beams, completes the structure. The structure can be formed using surface micromachining processes, with the structure preferably being formed from polycrystalline silicon, or alternately from silicon nitride. The structure can be used in combination with an actuator or formed on the same substrate (i.e. a silicon substrate) with the motive source, which may be a MEM actuator such as an electrostatic comb actuator, a capacitive-plate electrostatic actuator, or a thermal actuator.

According to various embodiments of the present invention, input and output can either move substantially in-phase with respect to each other or substantially out-of-phase with respect to each other for operation below resonance. Furthermore, the output displacement can be directed either substantially in-line with the first force of actuation or at an arbitrary angle with respect to the first force of actuation. Finally, the output displacement range can be either greater than the first linear displacement range (e.g. a multiplication factor of 5–60 when the first linear displacement range is 5 μm or less), with the second force of actuation being correspondingly smaller than the first force of actuation; or alternately, the second linear displacement range can be less than the first linear displacement range (e.g. about one-fifth to one-sixtieth of the first linear displacement range), with the second force of actuation being correspondingly greater than the first force of actuation (e.g. by a factor of 5–60).

In another embodiment, the displacement modifying structure is operatively coupled to at least one other displacement modifying structure thereby forming a displacement-modifying device.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENTS

Figure 1:
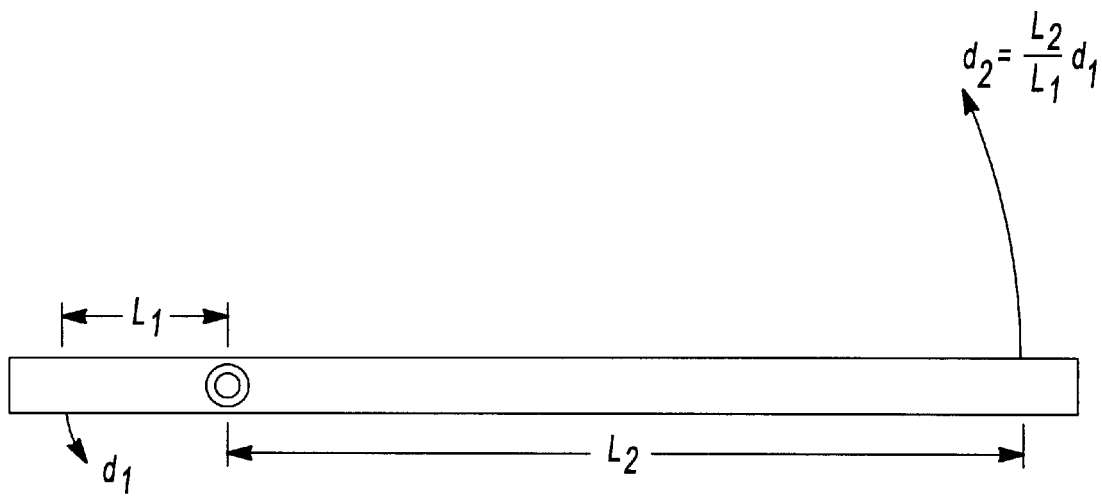
FIG. 1 is a schematic illustration of a prior art displacement modifying device based on a lever arm that is moveable about a pivot joint and which produces an arcuate displacement path.
Figure 2:
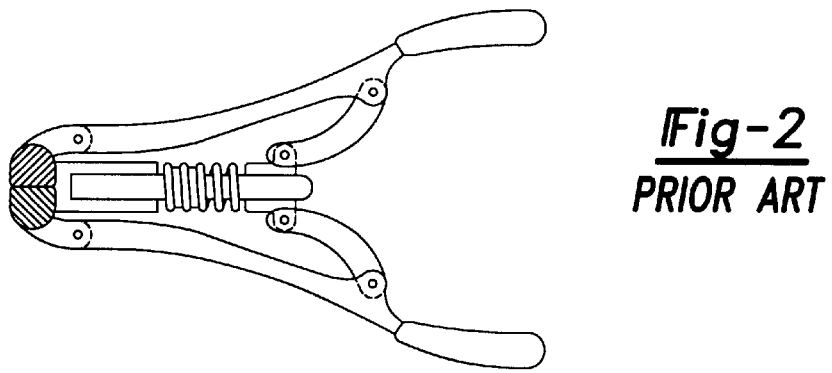
FIG. 2 is rigid mechanical linkage which when operated in one direction amplifies motion and which when operated in the opposing direction amplifies force (specifically, the mechanism is a crimping device)
Figure 3A:
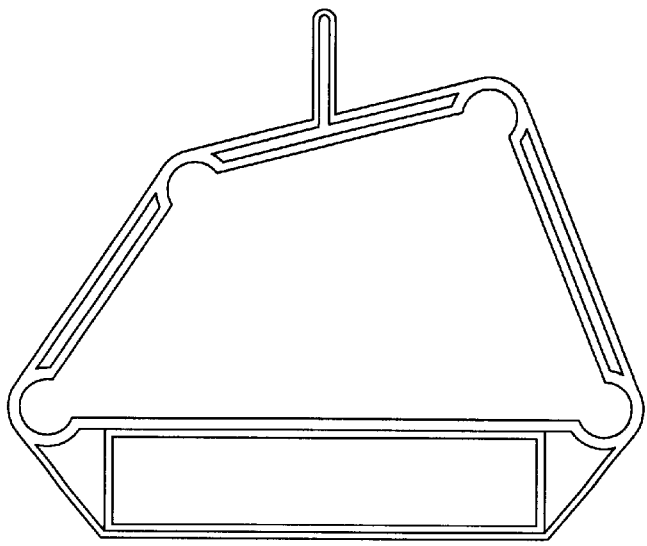
FIGS. 3a and 3b illustrate prior art compliant mechanisms which exhibit lumped compliance as a result of the flexural joints utilized in these mechanisms.
Figure 3B:
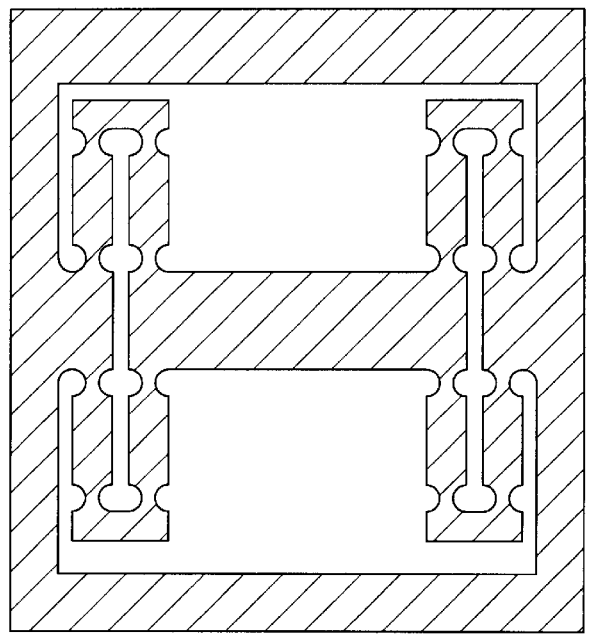
Figure 4:
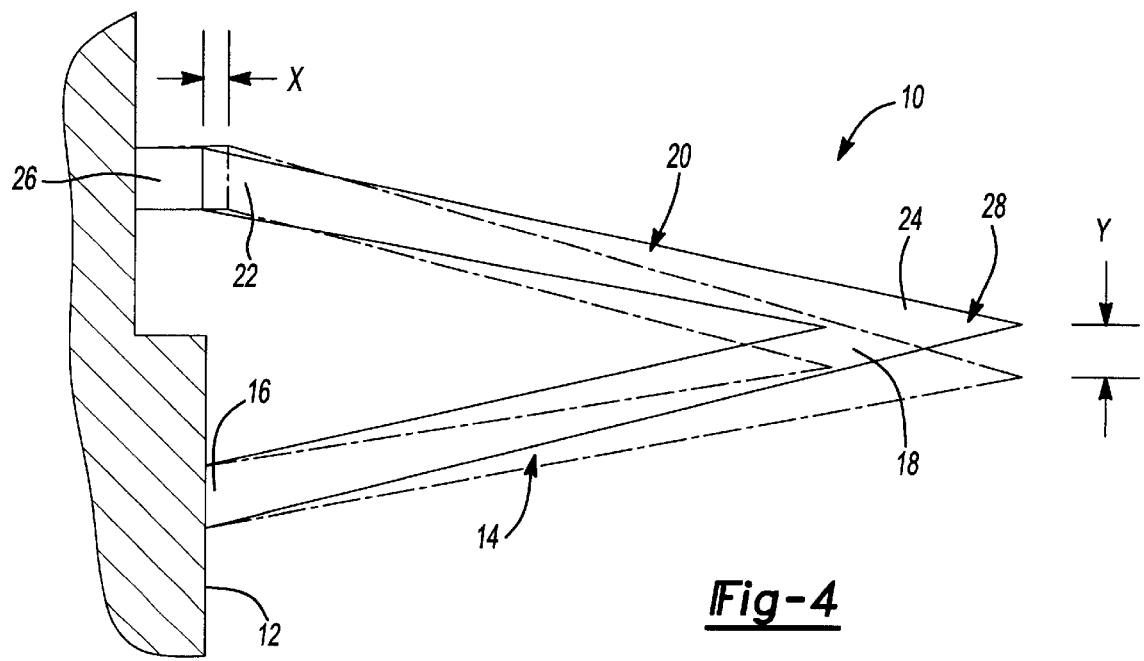
FIG. 4 is a schematic illustration of the triangular element forming the base structure of the present invention.

Referring now to the drawings, FIG. 4 illustrates the base displacement amplifying structure, generally designated at 10, according to the principles of the present invention. The structure 10 is a generally triangular form which is defined by three legs and which is supported by a base 12, ground or substrate.

The first leg of the triangular form is defined by a beam 14. The beam 14, which includes a fixed or anchored end 16 and a moveable end 18, is hereinafter referred to as the "static beam 14". The term "static" is used in referencing beam 14 as a result of the beam's anchored end 16. As will be readily appreciated from the discussion which follows, the beam 14 is not "static" in the traditional sense of that word since the beam 14 includes a moveable end 18 and further since the beam 14 is flexible.

The second leg of the base structure's triangular form is defined by a beam which is hereinafter referred to as the "dynamic beam 20". Dynamic beam 20 includes a first or input end 22 and a second or output end 24. This beam 20 is herein referred to as the "dynamic" beam because its input end 22 is coupled to an actuator 26. The actuator 26 may be of any variety of motive force source including, by way of illustration and not limitation, piezoelectric actuators, thermal actuators, SMA actuators, capacitive-plate electrostatic actuators, electrostatic comb actuators, pneumatic actuators, hydraulic actuators, or mechanical actuator systems.

The output end 24 of the dynamic beam 20 is connected to the moveable end 18 of the static beam 14 in a pivotless or jointless connection. As those terms are used herein, this specifically excludes utilization of hinges, flexural joints, living hinges, and pivots for the connection of the static beam 14 to the dynamic beam 20. Preferably, the static and dynamic beams 14 and 20 of the structure 10 are formed together in a unitary or one-piece construction. However, the beams 14 and 20 can be provided as individual elements connected to one another at their respective ends 18 and 24 in a pivotless or jointless manner resulting in the two beams 14 and 20 which provide the structure 10 with an integral construction.

The third leg of the base structure's triangular form is an imaginary leg defined by the base 12 and extending between the fixed end 16 of the static beam 14 and the input end 22 of the dynamic beam 20.

As mentioned above, the beams 14 and 20 are flexible and, as such, can be formed from a variety of ductile materials including, by way of illustration and not limitation, nylon, aluminum, steel and nickel-titanium alloy, depending on the design criteria of the given structure. When the actuator 26 imparts an input displacement X to the input end 22 of the dynamic beam 20, beams 20 and 14 will flex as a result of the anchoring of fixed end 16 of the static beam 14 and the elasticity characteristics of the beams 14 and 20 themselves. As a result of the prescribed construction, the output displacement Y, measured as the movement of output 28, will be greater than the input displacement X. Additionally, when the input displacement X is generally in the direction of the apex formed by the connection of the static beam 14 with the dynamic beam 20, the direction of the output displacement Y will generally be transverse or perpendicular to the direction of the apex. The displaced or flexed position of the structure 10 is generally illustrated in phantom in FIG. 4.

Figure 5:
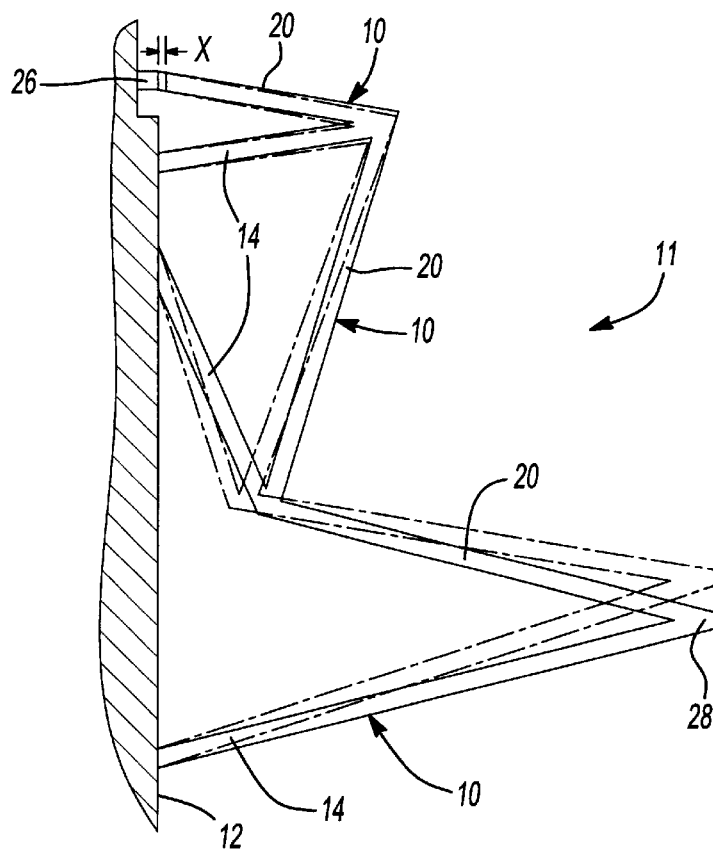
FIG. 5 is a schematic illustration of a plurality of the structures seen in FIG. 4 being utilized in conjunction with one another and arranged to form a displacement amplifying device.

By joining two or more of these base structures 10, the output displacement Y from the last of the structures 10 in the series can be designed to achieve a desired amplitude ratio (Y/X). Three structures 10 are illustrated in the device 11 of FIG. 5. (Generally throughout this description the term "structure 10" is used to identify one triangular form while the term "device 11" is used to designate a series of structures 10. The terms, however, are generally interchangeable throughout this description and in the claims (where appropriate). It is noted that in forming a device from a series of the structures 10, the input end 22 of each successive dynamic beam 20 is connected to the output 28 of the immediately proceeding structure, the output being defined where the static and dynamic beams 14 and 20 are joined or merged together. For the sake of clarity, the output of the structure 10 or device 11 is generally designated at 28 in FIG. 4. Notably in FIG. 5, the illustrated configuration results in the direction of the output displacement Y being generally in an opposite direction than that illustrated in FIG. 4.

In comparing the forces transmitted by the structure 10 and device 11, it is noted that when driven as described above, the input force provided by the actuator 26 is changed and at the output end 28 of the structure the output force is decreased relative to the input force. For an ideal structure 10 or device 11, the output force times the output displacement would be equal to the input force times the input displacement. However, some losses will occur during transmission through the structure 10 or device 11. Actual structures 10 and devices 11 have been realized where the output force times the output displacement is generally equal to about 70%–90% of the input force times the input displacement.

From the above, it is seen that a series of the structures 10 designed and arranged with the interconnecting of their respective beams 14 and 20 can provide a predetermined geometric advantage and a predetermined mechanical advantage. The geometric advantage is herein defined as the ratio of an output displacement generated by the structure 10 or the device 11 in response to a given input displacement. The mechanical advantage is defined herein as the ratio of an output force generated by the structure 10 or device 11 in response to the input force.

Figure 6:
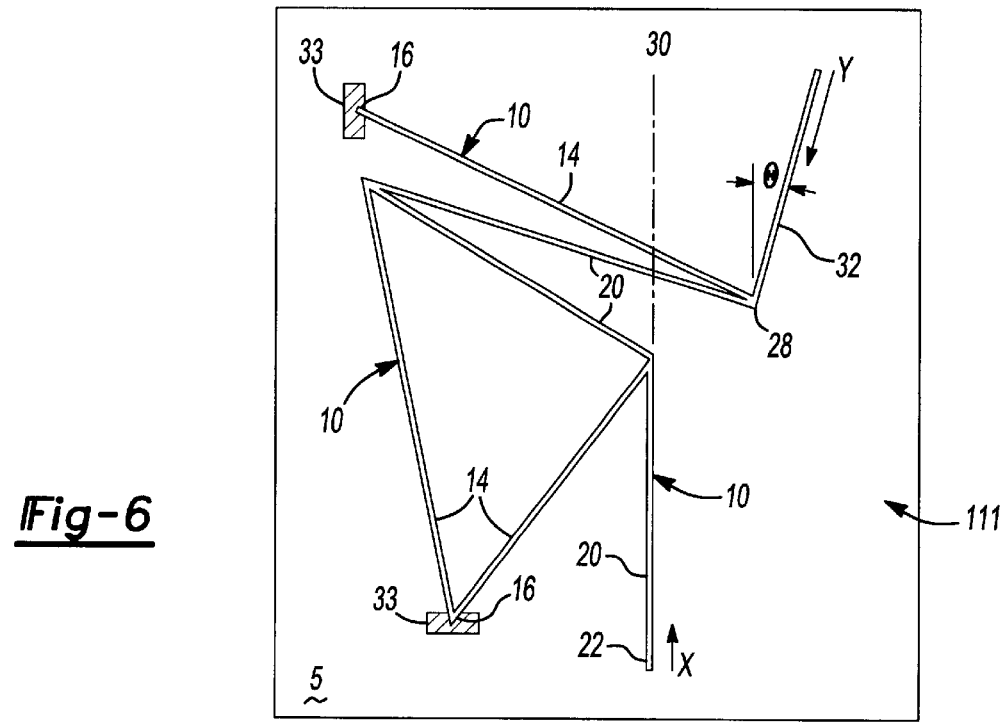
FIG. 6 is a schematic illustration of a plan view of one embodiment of a displacement-amplifying device according to the present invention.

Referring now to FIG. 6, it is seen that applying a different topology to the series of structures 10 yields a device 111 where the input displacement X is directed along an axis 30 and the amplified output displacement Y is directed at a predetermined angle θ with respect to the axis 30 through an output member 32 connected to the end output 28 of the device 11.

For microelectromechanical (MEM) applications, the entire device 111 is preferably formed on a silicon substrate 5 (which operates as the base 12), with the device 111 having lateral dimensions on the order of a few millimeters or less (e.g. 212 $\mu$m wide by 240 $\mu$m high), and with a thickness on the order of 10 $\mu$m or less. The width of the individual flexible beams 14 and 20 can range from about 1 $\mu$m to about 10 $\mu$m, and preferably about 1–2 $\mu$m wide.

The device 111 in FIG. 6 further includes an input beam 20 for coupling an input displacement X (with a direction and magnitude indicated by the small arrow in FIG. 6) from a motive source (i.e. a MEM actuator) to the structure 10, and an output beam 32 for conveying a multiplied output displacement Y (with a direction and magnitude indicated by the large arrow) from the device 111 to a load (not shown).

Each static beam 14 comprises a stationary end which is attached directly or indirectly to the substrate 15 at its fixed end 16 so that the fixed end 16 remains motionless during operation of the device 111. This can be done, for example, using a support post 33 extending upward from an upper surface of the substrate 5, with the fixed end 16 of each beam 14 being formed on or attached to the support post 33. In this way, each beam 14 can be suspended above the surface of the substrate 12 so that each beam 14 can flex in response to a force applied to the moveable end 18 of each beam 14. Finally, the device 111 can be formed by surface micromachining processes so that no piece-part assembly is required.

Figure 7:
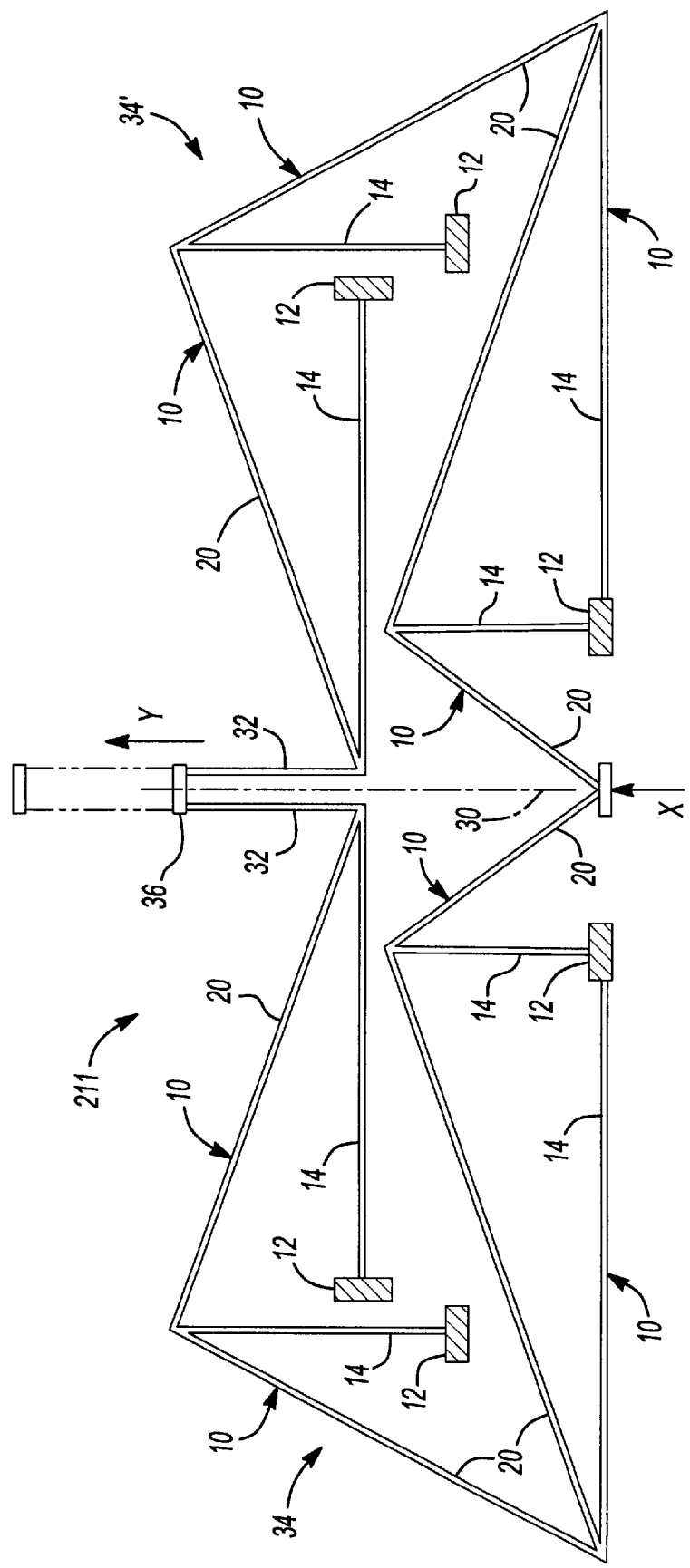
FIG. 7 schematically illustrates another embodiment of a device according to the principles of the present invention.

As seen in FIG. 7, the single input displacement X can be applied to the series of structures 10 forming a device 211, with the topology of the series of structures being configured such that the device 211 is formed of two mirrored halves 34 and 34'. Such a configuration may be utilized to provide the output displacement Y of the output members 32 generally along the axis 30 of the input displacement X. Further, output members 32 from each half 34 and 34' may be joined by a cross-member 36 to provide for a single output displacement and force. It is noted that the device 211 of FIG. 7 is formed by a total of eight structures 10, with four structures 10 being utilized to define each half 34 and 34'. The device seen in FIG. 7 also exhibits a 14:1 geometric advantage.

Figure 8:
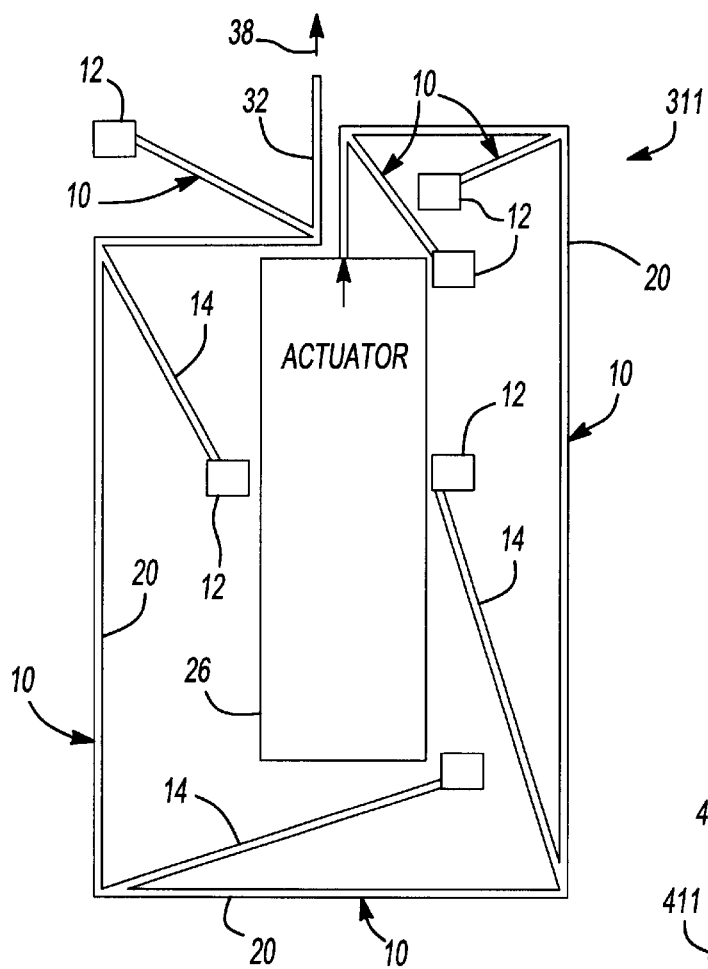
FIG. 8 is a schematic illustration of a device according to the present invention incorporated with a linear actuator to provide amplified linear output.

FIG. 8 schematically illustrates a topology where a compactly constructed device 311 is formed about a linear actuator 26 so as to provide a linear output designated by directional arrow 38. The topology in FIG. 8 illustrates how the structures 10 can be arranged so as to form an extremely compact device 311 by generally encircling the actuator 26. With this topology, consisting of six structures 10, the output of individual structures 10 is transferred clockwise about the device 311, by locating the static beams 14 interiorly of the dynamic beams 20, until the last structure 10, which has a reversed orientation.

Figure 9:
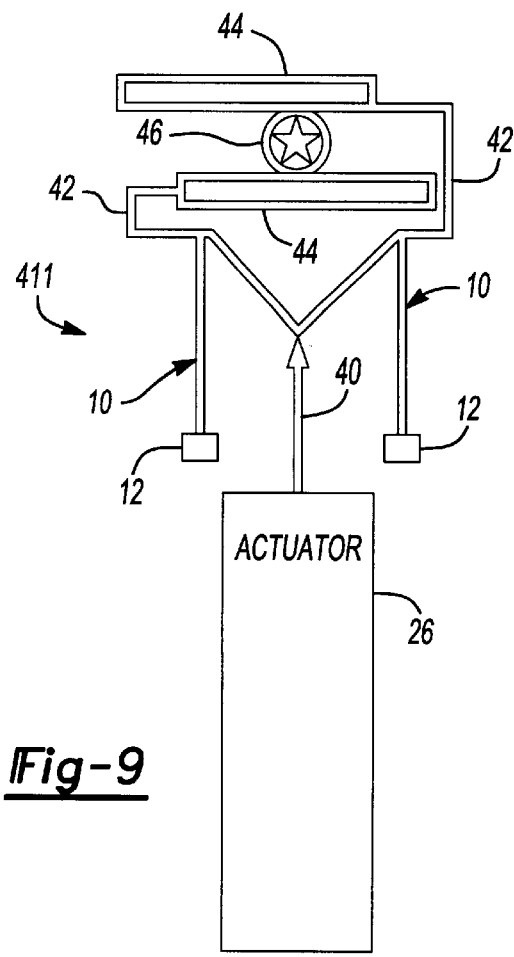
FIG. 9 is a schematic illustration of a displacement amplifying mechanism according to the principles of the present invention illustrated with a linear actuator and configured to produce an amplified rotary output.

In FIG. 9, a linear actuator 26 provides an input displacement along directional arrow 40 with two structures 10 forming the device 411. The two structures 10 are respectively oriented and connected by arms 42 to a pair of opposed toothed racks 44. As a result of their orientation, the single actuator imparts an amplified output displacement to each of the racks 44, but in an opposite direction. By incorporating a pinion gear 46 between the racks 44, rotary motion can be achieved as the output of the present invention.

Figure 10A:
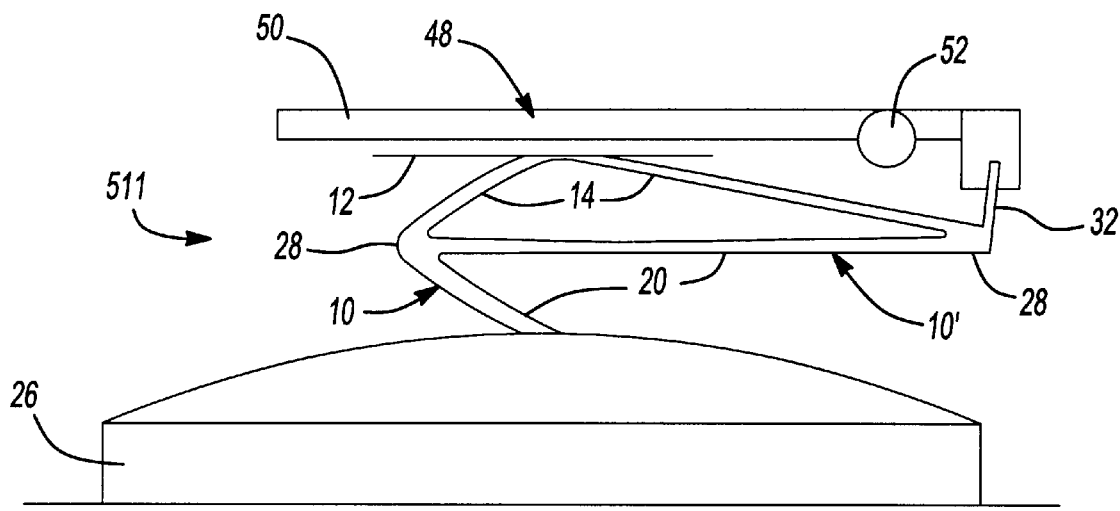
FIGS. 10a and 10b schematically illustrate an embodiment of the present invention as applied to operate a flapper valve.
Figure 10B:
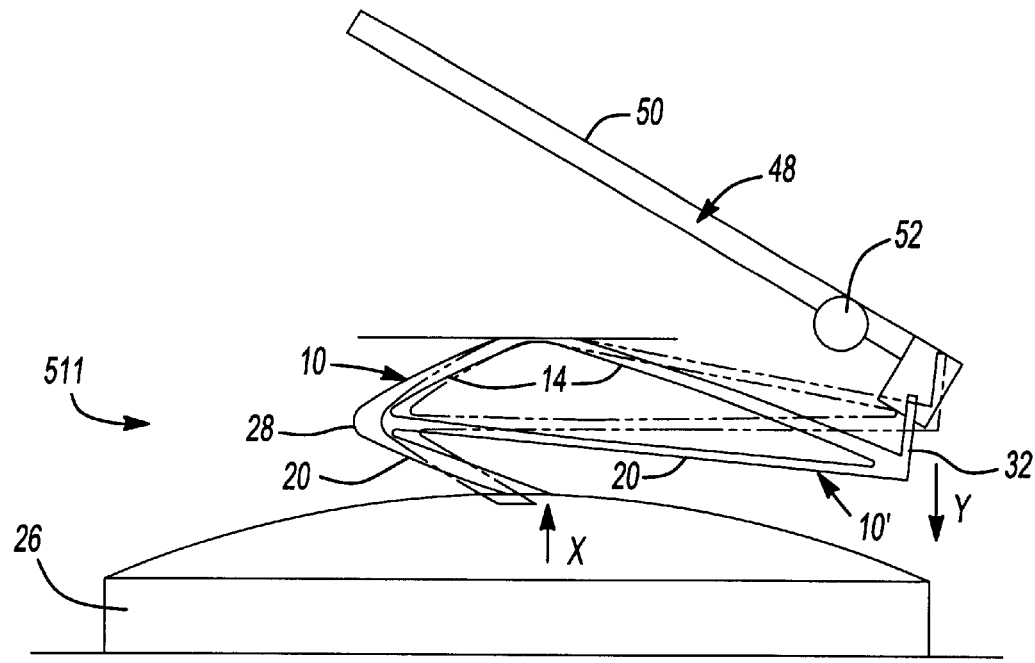

FIGS. 10 and 10a illustrate a topology where the input displacement is generally directed toward the anchored end, designated at 16, of the first (of two) structure's 10 static beam 14. As a result, the output 28 of the first structure moves in a direction generally aligned with the apex of that structure 10. By connecting the input end 22 of a second structure 10 to the output 28, on the interior side (between the static and dynamic beams 14 and 20) of the first structure 10, a compact construction is provided where the amplified output displacement Y is in a direction opposite the input displacement X. The output member 32 of the device 11 is illustrated as being coupled to actuate a flapper valve 48 (seen closed in FIG. 10a and actuated in FIG. 10b) which includes a flap 50 moveable about a pivot 52.

Figure 15A:
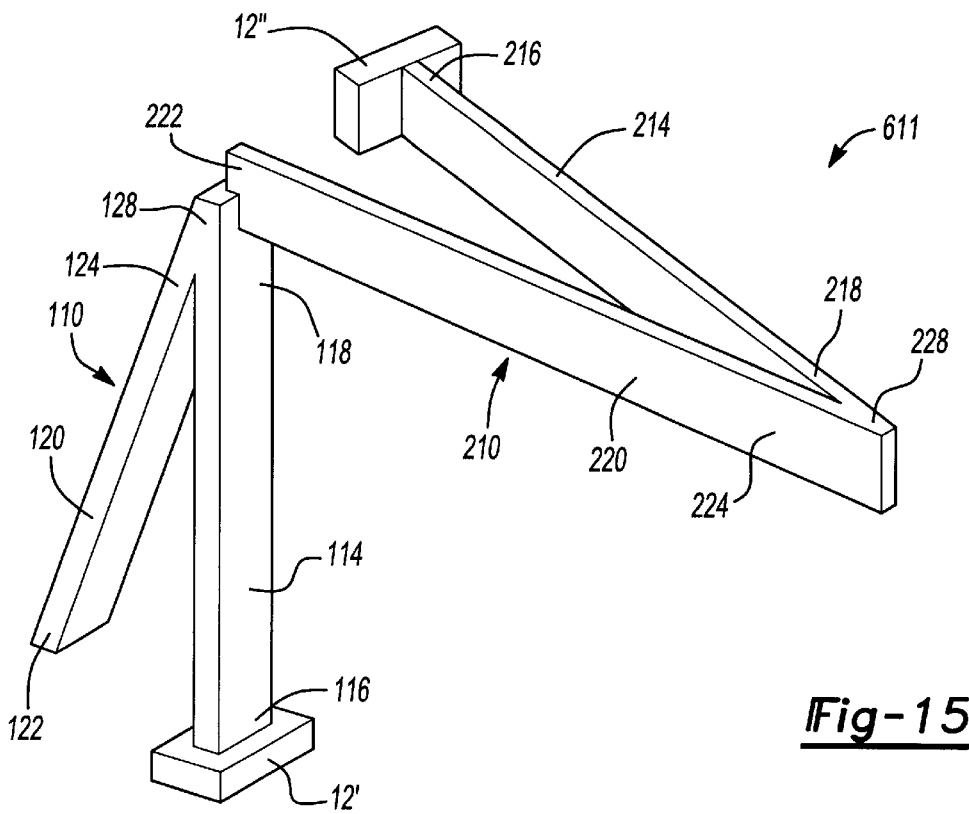
FIGS. 15a and 15b are schematic perspective views of another embodiment of the present invention, respectively showing the device in an unactuated and actuated condition.
Figure 15B:
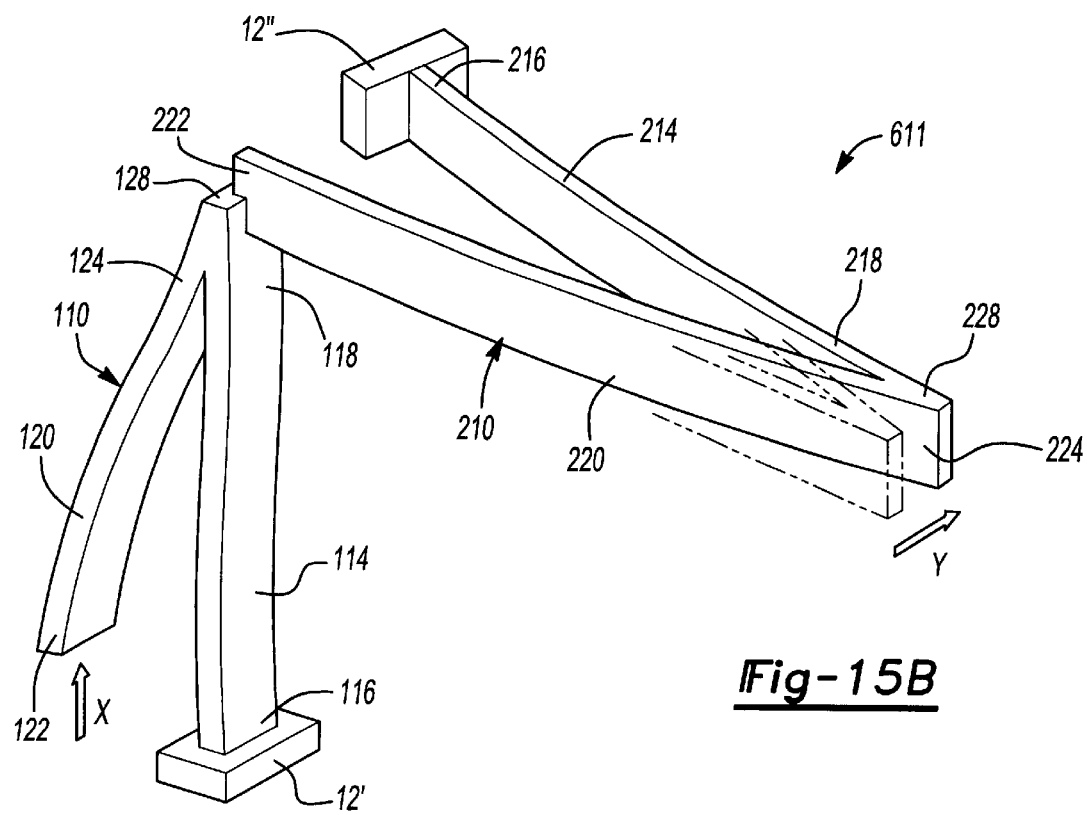

As so far described, the devices 11, 111, 211, 311, 411 and 511 have been applied in a two dimensional topology. If is further possible to configure the structures 10 to provide a three dimensional arrangement. Once such arrangement is illustrated in FIGS. 15a and 15b and is identified as device 611.

The three dimensional device 611 is composed of two base structures 110 and 210, each including a static beam 114, 214 and a dynamic beam 120, 220. The static beams 114, 214 include a fixed end 116, 216, secured to a stationary support 12', 12'', and a moveable end 118, 218. The moveable end 118, 218 is formed with or otherwise coupled to the output end 124, 224 of the dynamic bean 120, 220. The input end 122 of the dynamic bean 120 of one structure 110 is coupled to an actuator (not shown) while the input end 222 of the dynamic beam 220 of the other structure 210 is coupled to the apex or output 128 of the first structure 110.

To achieve a final output motion Y direction in a plane other than that of the input motion X direction, the orientation of the second structure 210 must be such that the fixed end 216 of its static beam 214 is not in the general plane defined by the first structure 110. In the illustrative embodiment, the second structure 210 is positioned approximately 90° out of plane from the first structure 110. As a result, the output Y direction is directed in a plane oriented approximately 90° relative to the plane of the input X direction. By locating the fixed end 216 of the second structure 210 in planes other than 90° to the plane of the first structure 110, the output Y direction can be correspondingly redirected and oriented as the design criteria require.

In designing a structure 10 or any of the devices 11, 111, 211, 311, 411 and 511 (hereinafter collectively referred to as just device 11) to respond to particular input forces and displacements and to generate predetermined output forces and displacements, a topology optimization routine can be used to be determined an ideal structural form for the structure 10. The topology-optimized designs essentially satisfy force and motion characteristics in a qualitative sense. In general, the design of the structure or device 11 is driven by the relationship between the input and output forces and the required displacements. Once the topology has been established, the next logical step is to address the size and shape of the compliant mechanism that satisfies specific design requirements. To quantify the size and shape of a structure or device 11, the optimization formulation must address the following design criteria: (1) required kinematics motion (both the magnitude and direction); (2) a desired mechanical advantage or geometric advantage; (3) matching dynamic stiffness of the mechanism within the operating frequency range; (4) material properties; (5) stress limitations; (6) buckling instabilities; (7) weight and size limitations, if any; (8) efficiency; and (9) fatigue requirements.

Topology optimization provides qualitative results in that it provides a kinematically functional mechanism. It cannot provide a mechanism with prescribed performance characteristics such as desired mechanical advantage or geometric advantage. Local constraints such as stress constraints, and buckling constraints cannot be imposed during topology optimization. However, all such constraints can be taken into account in size and shape optimization. During size and shape optimization, the start is with a known topology that is derived from a known topology optimization procedure for prior compliant mechanisms or a known rigid-link mechanism. For structural optimization, the stiffness of the structure 10 or device 11 must be quantified in order to achieve maximum performance. Since the structure 10 or device 11 absorbs energy as the mechanism deforms, one way to quantify the performance of the structure 10 or device 11 is to maximize the energy efficiency. The compliance of each beam 14 and 20 is generally controlled by varying the width and/or the thickness of the beam 14 and 20 along the length thereof.

The compliancy of the beams 14 and 20 causes them to act similar to a leaf spring, bending in response to an applied force and returning to its original unflexed position once that force is removed. Such flexing motion stores elastic energy which can be reused for efficient operation of the structure 10. Additionally, the flexing action of the beams 14 and 20 eliminates the need for stroke return springs, which are generally required in pivoting mechanisms. The compliant nature of the structure 10 is advantageous in that it minimizes friction, wear and backlash which are commonly found in pivoting mechanisms as well as in prior compliant mechanisms.

Figure 11A:
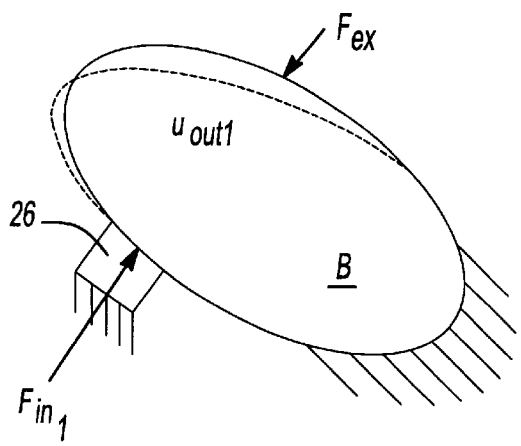
FIGS. 11a and 11b are diagrammatic illustrations of a force body diagram for an elastic body.
Figure 11B:
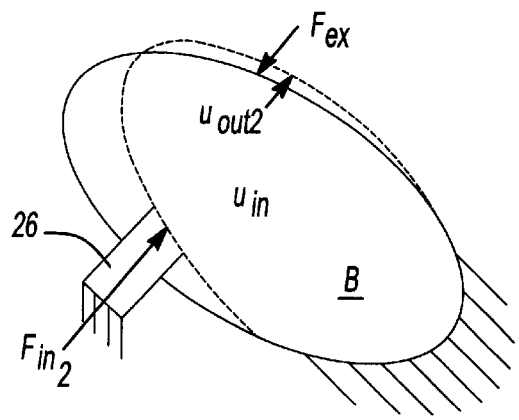
Figure 12A:
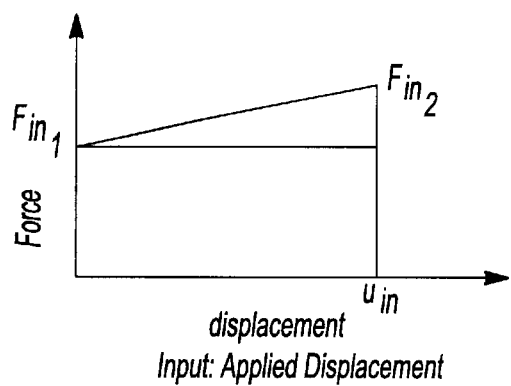
FIGS. 12a and 12b are force verses displacement graphs respectively for the input displacement with an applied load and the output displacement with an applied load of the force body diagrams seen in FIGS. 11a and 11b.
Figure 12B:
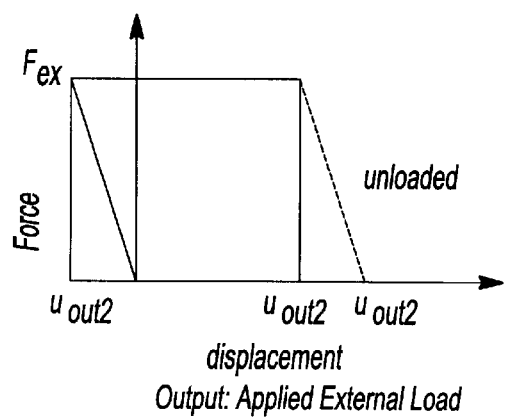

Considering a linear elastic body, work can be measured at both the input and output ports by assuming certain boundary conditions. As shown in FIGS. 11a and 11b, these boundary conditions are applied in two separate stages. First the external force ($F_{ex}$) is applied to the body (B) while the input ($F_{in1}$) is held fixed. The output displaces in the opposite direction of the desired motion while the actuator generates a reaction force to sustain the position of the input. The ratio of the external load to the input reaction force can be defined as the initial mechanical advantage. Second, the input is actuated ($F_{in2}$) a finite distance with the external load ($F_{ex}$) applied thereby moving the output in the desired direction. The second input reaction force is then measured along with the second output displacement. The mechanism now exhibits a loaded geometric advantage and a secondary mechanical advantage. If the external force is released in the actuated state, the output will extend to a new position. The ratio of the input displacement to the output displacement can now be thought of as the unloaded geometric advantage. Triangular regions of FIGS. 12a and 12b illustrate the energy absorbed due to loading and flexure at the input and output. The shaded areas at both ports represent the reciprocal work or a fixed kinematic relationship between the input and the output. The force/displacement history for both input and output ports then displays the following behavior. At the input port, $\mu_{in}$ represents the applied input displacement. The variables $F_{in1}$ and $F_{in2}$ represent the initial "unactuated" input force and the final "actuated" input force respectively. At the output port, the Force, $F_{ex}$, represents the applied external load. The displacements $\mu_{out1}$ and $\mu_{out2}$ represent the loaded, unactuated and the loaded, actuated positions of the output port.

Additionally, $\mu_{out0}$ represents the unloaded, actuated position of the output port.

The shaded area represents the work performed at the input port that is transferred to the output port. Effectively, this represents the additional work done at the output port due to the applied work at the input port. According to the Reciprocal Work theorem, the shaded areas are equal. The triangular regions in both the input and output figures represent the potential energy stored by the elastic body.

To obtain maximum performance, compliant mechanisms must carefully trade off stiffness and flexibility. By formulating the objective function to maximize the energy efficiency subjected stress constraints ($S_i$) material choice), geometric constraints ($g_i$) and equilibrium conditions (desired force magnification (MA) and desired stroke magnification (GA)), a quantitative formulation for the optimization of structure 10 or device 11 can be achieved. If the work applied to the body is defined as positive work, then the work extracted from the body is defined as negative work (since the external force opposes the output displacement). The mechanical energy efficiency of the mechanism is the output energy divided by the input energy and can be computed using the following formula:

$$\eta_{efficiency} = \frac{F_{ex}\left(u_{out2} + \frac{1}{2}u_{out1}\right)}{\frac{u_{in}}{2}(F_{in1} + F_{in2})}$$

where $\mu_{in}$ represents an input displacement applied to the structure 10 or device 11 at dynamic beam 20; $F_{in1}$ represents an initial (i.e. unactuated) input reaction force necessary to hold the dynamic beam 20 in a fixed or unactuated position during loading by an external load, $F_{ex1}$ applied to the output 28; $F_{in2}$ represents a final (i.e. actuated) input force applied to the dynamic beam 20 to produce the input displacement $\mu_{in}$; and $\mu_{out2}$ represents the displacement of the output 28 produced by the final input force, $F_{in2}$. From this equation, those skilled in the art will recognize that to increase the mechanical energy efficiency, $\eta_{efficiency}$, of the structure 10 or device 11, the input energy, given by the denominator of the above equation, should be minimized and the output energy, given by the numerator of the above equation, should be maximized. Minimizing the input energy amounts to reducing $F_{in1}$ and $F_{in2}$ which lowers the strain energy absorbed by the structure 10 or device 11 and also lowers an amount of work that is available to displace a load connected to the output 28.

At the output port, maximizing the output energy indirectly decreases the magnitude of $\mu_{out1}$ and maximizes the output displacement, $\mu_{out2}$, against the external load. An advantage of the formulation is that the mechanical or geometric advantage may be constrained during the optimization process. The resulting mechanism will still posses optimal energy efficiency while satisfying geometric or mechanical advantage requirements.

Due to elastic deformation, compliant mechanisms do not maintain constant mechanical or geometric advantages. Rather these characteristics change relative to the boundary conditions experienced by the mechanism. Because of this fact, a specific mechanical or geometric advantage can only be designed under specific boundary conditions. However, maximizing the efficiency of a compliant mechanism indirectly lowers the mechanism's internal strain energy. The mechanical advantage of a compliant mechanism will remain nearly constant over a range of boundary conditions as the mechanism's internal strain energy is minimized. Consequently, compliant mechanisms that achieve a high mechanical efficiency will provide near constant mechanical or geometric advantages over a wide range of boundary conditions.

In order to optimize the design, both the individual cross-section shape and the overall mechanism geometry are adjusted to maximize performance. The size and shape optimization formulation for maximizing mechanical energy efficiency is then posed (max $\eta_{efficiency}(S_1, g_1)$) subject to the following constraints:

$$s_{i_{min}} \leq s_i \leq s_{i_{max}}$$

$$g_{i_{min}} \leq g_i \leq g_{i_{max}}$$

$$h_1 = \frac{F_{ex}}{F_{in1}} - MA_{desired} \text{ or } h_1 = \frac{\mu_{out2}}{\mu_{in}} - GA_{desired}$$

$$g_1 \leq \int \text{Volume-Resource}_{max}$$

$$g_{i+1} \leq \sigma_1 - \sigma_{max}$$

$i=1 \ldots N$ elements where $S_i$ represents the beam cross-section parameters and $g_i$ represents the geometric coordinates of the mechanism geometry (the size and placement of each beam axis). $MA_{desired}$ and $GA_{desired}$ represent the desired mechanical and geometric advantage respectively which can be constrained during the optimization process. Stress constraints, represented by $\sigma_{max}$, can be enforced during the optimization process. The resource constraint, Resourse$_{max}$, limits the total volume of the structure. Material characteristics and performance requirements are also input into the optimization problem. The optimization routine then optimizes the size and shape of the compliant mechanism to improve its efficiency while satisfying all relevant design constraints.

Optimization is performed by dividing each beam of the structure into six (although a greater or lesser number of elements could be utilized) beam elements (a total of twelve elements) per structure. The thickness of each beam element is initially held constant at, for example 0.5", and the modulus of elasticity for the material is inputted, for example $3.0 \times 10^5$ for nylon. The input is assumed to have a given displacement in the X direction and the external load is assumed a given magnitude of force in the negative Y direction. Both the height of the beam elements and the location of the output port were chosen as design variables. By varying these design parameters, the structure 10 could achieve maximum energy efficiency while satisfying mechanical or geometric advantage requirements. The response of the system is determined using a linear finite element analysis. Two optimized examples of simple transverse displacement structures 10 with various mechanical and geometric advantages are shown in FIGS. 13a and 13b and 14a and 14b where E=Young's modulus of the material, "we" is the element width perpendicular to the plane of the paper, NA=mechanical advantage or force magnification, GA=Geometric advantage or stroke magnification or output stroke over input stroke, subscript "loaded" implies under the action of applied external load on the output (10N or 5N), volume—constraint on total volume of the mechanism, max σ=stress constraint [6].

Figure 13A:
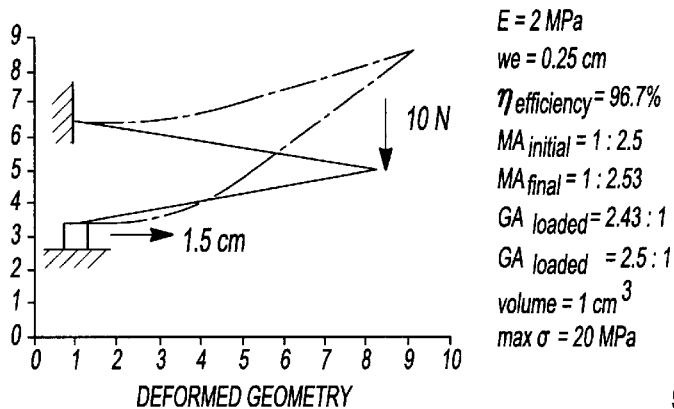
FIGS. 13a and 13b are respectively a deformed geometry graph and a optimized size and shape graph of a structure under a first set of specified design criteria according to the principles of the present invention.
Figure 13B:
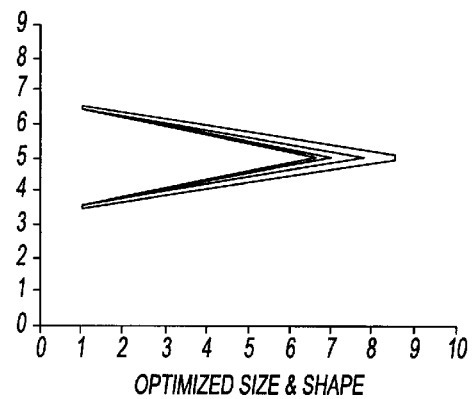
Figure 14A:
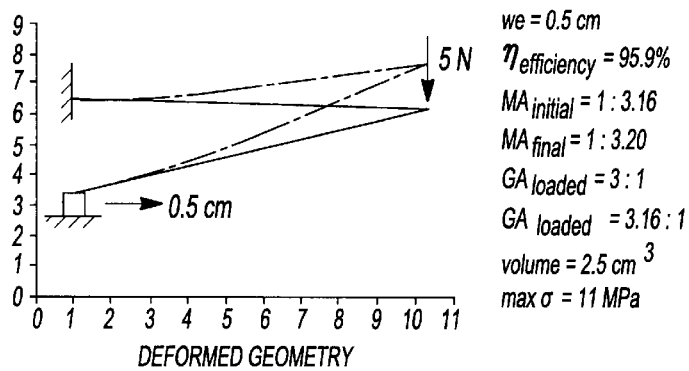
FIGS. 14a and 14b are respectively a deformed geometry graph and a optimized size and shape graph of a structure under a second set of specified design criteria.
Figure 14B:
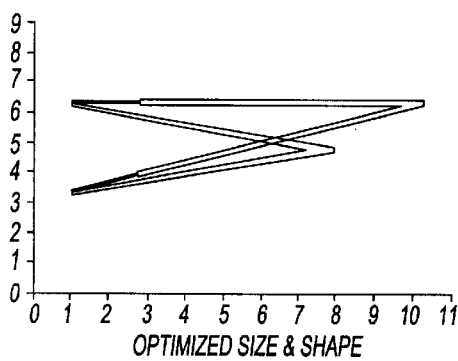

Optimization which was relatively insensitive to the initial starting guess. The simplicity of the beam finite element models allowed the optimization process to converge in only a few minutes for most cases. The triangular shaped structures 10 provided efficient transmission of force and displacement. Most designs obtained efficiencies in excess of ninety percent. Resulting mechanism designs tended to be characterized as having the thinner, more flexible segments near the actuator and ground locations as seen in FIGS. 13b and 14b. Some important characteristics are noted from the optimization of the simple transverse displacement structures of 13b and 14b. These characteristics were: the initial mechanical advantage is equal to the vertical distance between the ground and the input divided by the horizontal distance between the input and output; due to the linearity of the model, the initial mechanical advantage is always equal to the inverse of the unloaded geometric advantage; and the direction of the kinematic motion is nearly perpendicular to the grounded leg of the topology.

While the above description constitutes the preferred embodiment of the present invention, it will be appreciated that the invention is susceptible to modification, variation and change without departing from the proper scope and fair meaning of the accompanying claims.

We claim:

1. A displacement modifying structure for receiving an input displacement from a motive source and generating a multiplied displacement therefrom for provision to a load, said structure comprising:
    a static beam having a fixed end and a moveable end;
    a dynamic beam having a first end and a second end, said first end connected between the motive source and said moveable end of said static beam, said second end connected through a pivotless joint to said moveable end of said static beam, at least one of said static beam and said dynamic beam varies in width over its length;
    whereby upon movement of said first end over a first distance by the motive source, said second end and said moveable end move over a second distance for provision to the load, said second distance being greater than said first distance; and
    wherein said second end connected to said moveable end of one structure is further connected to an adjacent structure at a first end of a dynamic beam of said adjacent structure.

2. The displacement modifying structure of claim 1 wherein at least one of said static beam and said dynamic beam exhibits compliancy distributed along its length.

3. The displacement modifying structure of claim 1 wherein said static beam and said dynamic beam are unitarily formed with one another.

4. The displacement modifying structure of claim 1 wherein said structure is operatively coupled to at least one other displacement modifying structure thereby forming a displacement modifying device.

5. The displacement modifying structure of claim 4 wherein said device includes more than one output.

6. The displacement modifying structure of claim 1 wherein said second end connected to said moveable end forms an output end of said structure.

7. The displacement modifying structure of claim 1 wherein said second end connected to said moveable end forms an input end of said stroke transmission structure.

8. A microelectromechanical (MEM) apparatus, comprising:
    a MEM actuator providing movement over a first linear displacement range, and further providing a first force of actuation; and
    a pivotless compliant structure operatively connected to the MEM actuator for receiving the movement over the first linear displacement range and the first force of actuation and generating therefrom a second linear displacement range which is different from the first linear displacement range, and a second force of actuation which is different from the first force of actuation, said pivotless compliant structure having a MEM actuator providing movement over a first linear displacement range and further providing a first force of actuation, said pivotless compliant structure operatively connected to the MEM actuator for receiving the movement over the first linear displacement range and the first force of actuation and generating therefrom a second linear displacement range which is different from the first linear displacement range, and a second force actuation which is different from the first force of actuation, said pivotless compliant structure further includes a plurality of dynamic beams and static beams provided in pairs and connected in series; wherein said dynamic beams, other than said dynamic beam in a first and first pair of said series, are connected between said moveable end of a proceeding structure and said input end of a succeeding structure.

9. The MEM apparatus of claim 8 wherein each said dynamic beam is oriented at an angle of less than 90° with respect to each static beam to which that dynamic beam is connected.

10. The MEM apparatus of claim 8 wherein the input beam and the output beam move substantially in-phase with respect to each other.

11. The MEM apparatus of claim 8 wherein the input beam and the output beam move substantially out-of-phase with respect to each other.

12. The MEM apparatus of claim 8 wherein the second force of actuation is substantially in-line with the first force of actuation.

13. The MEM apparatus of claim 8 wherein the second force of actuation is directed at an angle with respect to the first force of actuation.

14. The MEM apparatus of claim 8 wherein the second linear displacement range is greater than the first linear displacement range and the second force of actuation is less than the first force of actuation.

15. The MEM apparatus of claim 14 wherein the second linear displacement range is in the range of five to sixty times larger than the first linear displacement range.

16. The MEM apparatus of claim 14 wherein the first linear displacement range is less than or equal to five microns.

17. The MEM apparatus of claim 8 wherein the second linear displacement range is less than the first linear displacement range, and the second force of actuation is greater than the first force of actuation.

18. The MEM apparatus of claim 17 wherein the second linear displacement range is in the range of one-fifth to one-sixth of the first linear displacement range.

19. A method of optimizing size and geometry of a displacement modifying structure comprising the steps of:
    providing a displacement modifying structure having a static beam with a fixed end and a moveable end, a dynamic beam having a first end and a second end, said second end connected through a pivotless joint to said moveable end of said static beam, whereby upon movement of said first end over a first distance by the motive source, said second end and said moveable end move over a second distance for provision to the load, said second distance being greater than said first distance;

dividing said dynamic beam into a plurality of beam elements;

dividing said static beam into a plurality of beam elements; and conducting finite element analysis on each of said beam elements of said dynamic beam and said static beam; and constructing said displacement modifying structure based on said finite element analysis with at least one of said dynamic beam and said static beam has a width which varies over the beams length.

20. A displacement modifying device for receiving an input displacement from a motive source and generating a multiplied displacement therefrom for provision to a load, said device comprising:

a plurality of base structures including at least first and second base structures;

said first base structure including a static beam having a fixed end and a moveable end, a dynamic beam having an input end and a second end, said second end connected through a pivotless joint to said moveable end of said static beam and defining an output, said input end of said first structure adapted for connection to the motive source;

said second base structure including a static beam and a dynamic beam, said static beam of said second structure having a fixed end and a moveable end, said dynamic beam of said second structure having an input end and a second end, said second end connected through a pivotless joint to said moveable end of said static beam and defining an output, said input end of said dynamic beam of said second structure being connected to said output of said first structure; and whereby upon movement of said input end of said first structure over a first distance by the motive source, said output of said second structure moves over a second distance for provision to the load, said second distance being greater than said first distance.

21. The displacement modifying device of claim 20 wherein at least one of said static beam and said dynamic beam varies in width over its length.

22. The displacement modifying device of claim 20 wherein said static beam and said dynamic beam are unitarily formed with one another.

23. The displacement modifying device of claim 20 wherein said device is formed of two halves cooperating to define a common device output.

24. The displacement modifying device of claim 20 wherein said device is formed of two halves each defining a final output, said final outputs being out of phase with one another.

25. The displacement modifying device of claim 24 wherein said two final outputs are operatively coupled to each other to produce a rotary output.

26. The displacement modifying device of claim 25 wherein said two final outputs are coupled to each other by a rotary member located between said two final outputs, said rotary member being caused to rotate about an axis therethrough upon movement of said two final outputs.

27. The displacement modifying device of claim 20 wherein at least one of said static beam and said dynamic beam exhibits compliancy distributed along its length.

28. The displacement modifying device of claim 20 wherein said device is a two dimensional device.

29. The displacement modifying device of claim 20 wherein said device is a three dimensional device.

30. The displacement modifying device of claim 20 wherein movement of said output of said second structure is directed in a plane other than a plane generally defined by said first structure.

31. The displacement modifying device of claim 20 wherein said first structure generally lies in first plane and said second structure generally lies in a second plane.

32. The displacement modifying device of claim 31 wherein said first and second planes are non-parallel planes.

33. The displacement modifying device of claim 31 wherein said first and second planes are oriented with respect to each other generally at about 90°.

\* \* \* \* \*